Aug. 8, 1939.   G. MÖLLER   2,169,159

MEANS FOR ACCURATE SCREW CUTTING

Filed Jan. 13, 1939   2 Sheets-Sheet 1

Inventor:
Georg Möller,
by Frank S. Appleman,
attorney

Aug. 8, 1939.  G. MÖLLER  2,169,159
MEANS FOR ACCURATE SCREW CUTTING
Filed Jan. 13, 1939  2 Sheets-Sheet 2

Inventor:
Georg Möller,

Patented Aug. 8, 1939

2,169,159

UNITED STATES PATENT OFFICE 2,169,159

MEANS FOR ACCURATE SCREW CUTTING

Georg Möller, Berlin-Neukolln, Germany

Application January 13, 1939, Serial No. 250,831
In Germany June 11, 1938

10 Claims. (Cl. 51—95)

This invention relates to a thread cutting and grinding machine for the manufacture of threaded elements, such as bolts and the like.

More particularly, the invention relates to an improvement of the machine shown in U. S. Patent No. 2,125,584 granted to Erich Rotzoll. In the patent to Rotzoll, there is provided a guide block for the tool or workpiece which is actuated by means of a guide thread spindle, a supplemental movement being given to said guide block for correcting the variations of the block movement, this supplemental movement being controlled by means of a light sensitized device.

In the adjustment device of Rotzoll, a master thread spindle is mounted parallel with the threaded guide spindle controlling the cutting operation of the machine, and this rotation is adjusted in such manner that an imaginary point on the thread of the master spindle moves forward during each rotation the same distance as the block and which, when variation occurs between the forward movement of the guide block and the pitch of the master spindle, brings into action a light sensitive electric cell which actuates an electro-magnetic device for correcting the variation of the pitch.

In the present invention, instead of providing a master spindle running parallel to the guide spindle of the machine, there is provided a cylindrical longitudinal scale having spiral lines thereon and these lines are reflected by optical means on a diaphragm having an opening and a light sensitive cell is positioned behind this diaphragm so that variations in the thread on the guide spindle from the master thread causes an electromagnetic action for supplemental correction action of the feeding of the block. There is thus provided a highly accurate means for correcting longitudinal feed of screw cutting or grinding machines.

An object of this invention is to employ cylindrical scales with spiral division lines for the purpose of correcting, by electrical means under control of a light sensitive cell, variations in the thread cutting or grinding of a thread cutting or grinding machine.

A further feature of the invention is the employment of several optical systems with diaphragm and light sensitive cells reflecting light beams from the spiral division line of the longitudinal scales, these optical systems being mounted in such manner that in one system the scale division lies to the left of the opening of the diaphragm, while in the other system the scale division line lies to the right of the diaphragm, whereby any variation to the right or left will be immediately detected and corrected.

The principal object of the invention is to provide a light sensitive means for accurately cutting or grinding threads on a rotating blank.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1:
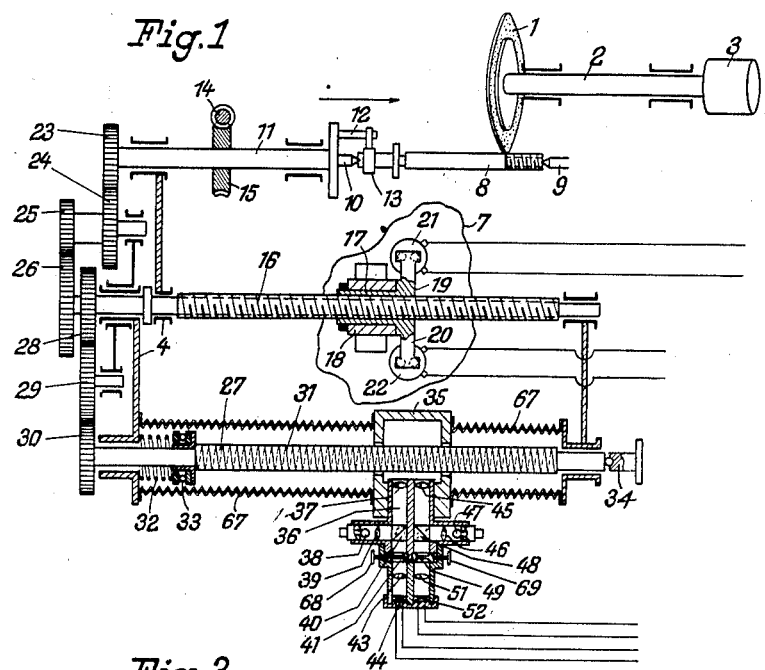
Figure 1 is a schematic view of a thread grinding device embodying the present invention.

The thread cutting machine shown has a thread cutting disk 1, which is mounted on the cutting spindle 2. The cutting spindle 2 is mounted in bearings of usual construtcion in a cutting spindle head (not shown in the drawing) and is driven through the pulley 3. The cutting disk 1 is adjustable transversely to and from the workpiece block or head 4 by sliding movement of the spindle head. The head 4 is slidable on tracks 5, 6 on the framework 7 of the machine. The workpiece 8, in which the thread is to be cut, is held between the center 9 of the tail stock (not shown in the drawing) and the live center 10 of the drive shaft 11 mounted in the head 4, and is rotated by means of the arm 12 and dog 13. The shaft 11 is actuated by a motor 70, through a change speed device (not shown in the drawings) and worm gearing 14, 15. The feeding movement of the head 4 is caused by a feed screw 16 which is mounted in the head 4 and which engages a nut 17. The nut 17 is rotatably mounted in a casing 18 which is in turn mounted in the frame of the machine in such manner that it is held against axial shifting. The nut 17 has two arms 19 and 20 placed at 180° to each other and on which are electro-magnets 21 and 22.

The feed screw 16 is actuated from the workpiece spindle 11 by means of wheels 23, 24, 25 and 26. Parallel with the feed screw 16 is a longitudinal scale 27 mounted in the head 4. It is actuated from screw 16 through toothed wheels 28, 29 and 30. The scale 27 is a cylindrical body highly polished, on whose circumferenece a division line 31 is spirally described. The thickness of the lines of the scale line 31 is usually 0.005-0.01 mm. Scale 27 is pressed against an abutment 34 with spherical contact surface by a spiral spring 32 engaging the bearing 33, so that the scale does not shift in the longitudinal direction. Scale 27 is sealed in a dustproof manner by means of a bellows covering 67. The pitch of the spiral division line 31 is, in the present embodiment, equal to the pitch of the thread of the feed screw 16. Accordingly, the toothed wheels 28, 29, 30 are selected in such manner that the number of rotations of the scale 27 is the same as those of the feed screw 16. By reason of the fact that the actuation of the scale 27 is not caused by the toothed wheel 26, but by the toothed wheel 28 which also is mounted on the feed screw 16, the toothed wheel gearing 28, 29, 30 can be maintained even though the toothed wheels 23—26 are interchanged. Naturally, the pitch of the division line 31 may also be less or greater than the thread pitch of the feed screw 16. However, in that case, it must be driven either faster or slower, as the case may be, which can be easily accomplished by changing toothed wheel gearing 28, 29, 30. The rotation of the scale 27 must always be so regulated that an imaginary point on the division line advances forward the same distance during one revolution as the block. Where the drive of the scale 27 originates is immaterial.

The scale 27 extends through a housing 35 which is mounted on the body of the machine and serves for the reception of one or more optical systems with their diaphragms and light sensitive cells together with lighting devices.

In the embodiment of Fig. 1, two separate optical systems are jointly housed in one housing 36, resulting in a closed construction unit. One of these optical systems consists of the objective 37 that is trained on the division line 31. The light rays starting from the light source 38 pass over the condenser 39 to the reflector mirror 40 which could be, for instance, a silvered double prism, through the objective and to the scale, and so reflect the picture of the division line through the objective back to the diaphragm 41. The diaphragm 41 has an opening 42 (Fig. 3) whose width is chosen to correspond with the thickness of the lines of the division line 31, taking into consideration the optical enlargement through objective 37. When the diaphragm is free, the light rays reflected from the polished surface of the scale 27 enter opening 42 over lens 43 to photocell 44. The second optical system has the same construction. The objective is numbered 45, the light source 47, the condenser 46, the reflector mirror 48, the diaphragm 49, the diaphragm opening 50, the lens back of the diaphragm 51 and the photocell 52. The diaphragm 41 may, for instance, be a blackened or otherwise light impervious small glass plate which possesses only at point 42, that is 50 a light pervious slit. The diaphragms may, of course, be of any other suitable material. Each diaphragm is adjustable transversely to the axis of the objective 37, i. e., 45, by means of adjusting screw 68, i. e., 69, so that the opening of the diaphragm can be adjusted in perfect alinement with the division line 31. It is pointed out here that the lighting device could also be mounted in front of the objective.

Figure 3:
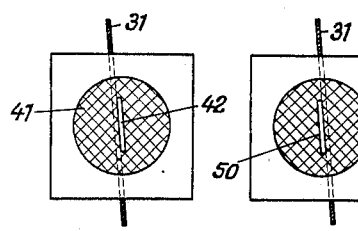
Figure 3 shows an arrangement of the diaphragm wherein duplicate optical systems are utilized.
Figure 2:
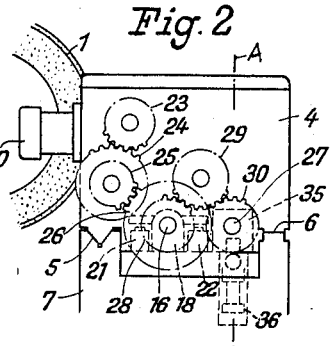
Figure 2 is a schematic section through the device shown in Fig. 1.

As can be seen from Fig. 3, diaphragm 41 of the first guiding system is mounted in such manner that the division line 31 lies to the left of the diaphragm opening 42. The diaphragm 49 of the second system, however, is mounted in such way that the division line 31 lies to the right of the diaphragm opening 50.

When the head 4 feeds longitudinally, scale 27 moves and both optical systems also move. If the feed movement is accurate, division line 31 of the scale 27 will not cover the diaphragm opening 42 and 50 (see Fig. 3). However, as soon as a retarding or accelerating feeding deviation appears, either one or the other diaphragm opening will be covered through scale line 31 and photocells 44, i. e., 52 transmit adjustment impulses to the magnet devices 21 and 22, which latter coact with the guide spindle nut 17. The feed screw 16 then undergoes a corrective axial shifting movement which is transmitted on the work table 4 and neutralizes the feeding fluctuations. The correcting impulses, due to action of the photocells, are led, in the known manner, by means of auxiliary devices, to the magnet, which magnet in turn is equipped with damping means in order to obtain a smooth rotation of the nut 17.

Figure 4:
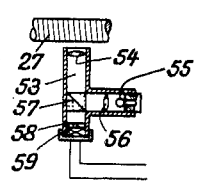
Figure 4 illustrates a modification of the optical system.

As will be seen from Fig. 4, a single optical system with a single photocell may be used. The system shown is placed in casing 53 and consists of the objective 54, the light source 55 with condenser 56, the reflector mirror 57, the diaphragm 58 and the photocell 59. The diaphragm 58 has the same kind of opening as diaphragms 41, i. e., 49, shown in Fig. 3. The opening of the diaphragm is so arranged that scale division line 31 will be projected on the opening. Photocell 59 acts according to whether the division line 31 covers or frees the diaphragm opening and actuates the electro-magnetic drive 21, 22 for the corrective supplemental movement of the feed screw 16. An uninterrupted swinging action of the rotatably mounted nut 17 takes place during this process. As will be seen, diaphragm 58 is mounted directly over the photocell 59 in the embodiment of Fig. 4. In the embodiment shown in Fig. 1, the diaphragm 41, i. e., 49, may also be mounted directly over its respective photocells 44, 52, and lens 43, 51 may be eliminated.

Figures 5, 6:
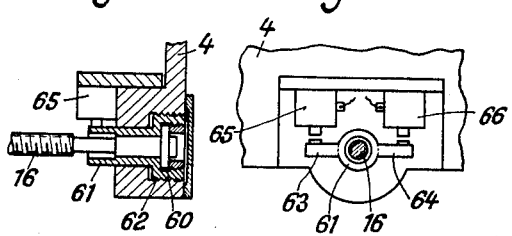
Figure 5 shows a modified embodiment, in cross section, of the transmitting device for correcting the motion of the screw cutting or grinding element.
Figure 6 is a side view of the arrangement shown in Fig. 5.
Figure 7:
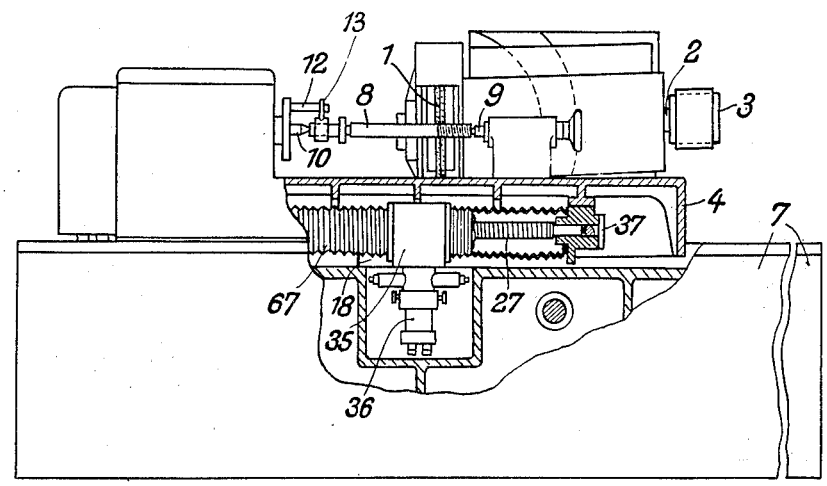
Figure 7 is a fragmentary front elevation of a machine embodying the invention, the view being partly broken away and shown as a section on line A—A of Figure 2.

The mechanical transmission of the corrective movements may also be accomplished as shown in Figs. 5 and 6. In this embodiment, flange 60 of the feed screw 16 is not mounted directly in the head 4, but in the bushing 61. Bushing 61 is rotatably mounted in a groove of the face of the head 4 and is adjustable by means of a thread 62. On the bushing 62, lateral arms 63 and 64 are mounted, to which are added magnets 65, 66 mounted on the face of head 4. When one or the other magnet receives a current impulse from its respective photocells, either arm 63 or 64 is drawn inward, which causes bushing 61 to turn in the thread worm 62 so that head 4 receives either an accelerating or retarding adjusting movement, depending on its feeding movement.

In the embodiments shown, scale 27 and feed screw 16 are mounted in the head which executes the feeding movement. This arrangement may, of course, be reversed, i. e., the feed screw 16 and the scale 27 may be mounted on the body 7 of the machine, while thread bolt 17 and the light sensitive adjusting system (36—52) may be mounted on the movable head. In addition, the scale may be mounted coaxially with the feed screw 16.

The adjusting device of the invention can not only be used in connection with a feed screw, but may also be used with any other feeding means such as, for instance, a feeding cam or the like.

I claim:

1. In a device for correcting speed variations of a thread forming machine, a feed screw provided with a thread extending therealong, a nut mounted on said screw to move longitudinally thereof upon rotation of the screw, means to support a workpiece movable with said nut, gearing connecting said workpiece and screw and causing rotation of the workpiece and screw simultaneously, means to drive said gearing, a spirally threaded scale geared to said screw to rotate therewith, said nut being shiftable circumferentially of said screw, and light sensitive electro-magnetic means controlled by the rotation of said scale and acting to shift the nut circumferentially of its screw upon longitudinal discrepancy of the screw with relation to said scale.

2. The apparatus of claim 1, characterized by having two optical systems, each having an optical axis and a light sensitive cell affected thereby, said systems being positioned with their optical axes closely adjacent the line of said scale but on opposite sides thereof.

3. In a device of the kind described, a bed, a table mounted on said bed for slidable movement longitudinally thereof, a feed screw for driving said table longitudinally, a casing fixed relative to said bed, a nut rotatable in said casing and engaging said feed screw, electro-magnetic means for tilting said nut selectively in opposite directions, a shaft having a polished surface and provided with a helical gauge line, gearing connecting the feed screw and shaft, a light source projecting light on said gauge line and shaft, and a light sensitive cell receiving light reflected from said shaft and having circuit connection with said electro-magnetic means.

4. In a device of the kind described, a bed, a table mounted on said bed for slidable movement longitudinally thereof, a feed screw for driving said table longitudinally, a casing fixed relative to said bed, a nut rotatable in said casing and engaging said feed screw, electro-magnetic means for tilting said nut selectively in opposite directions, a shaft having a polished surface and provided with a helical gauge line, gearing connecting the feed screw and shaft, a light source projecting light on said gauge line and shaft, a light sensitive cell receiving light reflected from said shaft and having circuit connection with said electro-magnetic means, and a perforated diaphragm between the light sensitive cell and shaft.

5. In a device of the kind described, a bed, a table mounted on said bed for slidable movement longitudinally thereof, a feed screw for driving said table longitudinally, a casing fixed relative to said bed, a nut rotatable in said casing and engaging said feed screw, electro-magnetic means for tilting said nut selectively in opposite directions, a shaft having a polished surface and provided with a helical gauge line, gearing connecting the feed screw and shaft, a light source projecting light on said gauge line and shaft, a light sensitive cell receiving light reflected from said shaft and having circuit connection with said electro-magnetic means, a head stock fixed on said table and including a workpiece driving shaft, gearing connecting the screw and head stock shaft, and a tail stock fixed on said table in alinement with the head stock.

6. In a device of the kind described, a bed, a table mounted on said bed for slidable movement longitudinally thereof, a feed screw for driving said table longitudinally, a casing fixed relative to said bed, a nut rotatable in said casing and engaging said feed screw, electro-magnetic means for tilting said nut selectively in opposite directions, a shaft having a polished surface and provided with a helical gauge line, gearing connecting the feed screw and shaft, a light source projecting light on said gauge line and shaft, a light sensitive cell receiving light reflected from said shaft and having circuit connection with said electro-magnetic means, a perforated diaphragm between the light sensitive cell and shaft, a head stock fixed on said table and including a workpiece driving shaft, gearing connecting the screw and head stock shaft, and a tail stock fixed on said table in alinement with the head stock.

7. In a device of the kind described, a bed, a table mounted on said bed for slidable movement longitudinally thereof, a feed screw for driving said table longitudinally, a casing fixed relative to said bed, a nut rotatable in said casing and engaging said feed screw, electro-magnetic means for tilting said nut selectively in opposite directions, a shaft having a polished surface and provided with a helical gauge line, gearing connecting the feed screw and shaft, a light source projecting light on said gauge line and shaft, a light sensitive cell receiving light reflected from said shaft and having circuit connection with said electro-magnetic means, a head stock fixed on said table and including a workpiece driving shaft, gearing connecting the screw and head stock shaft, a tail stock fixed on said table in alinement with the head stock, and a grinding head carried by said bed for supporting a grinding disk in working relation to a workpiece supported by said stock.

8. In a device of the kind described, a bed, a table mounted on said bed for slidable movement longitudinally thereof, a feed screw for driving said table longitudinally, a casing fixed relative to said bed, a nut rotatable in said casing and engaging said feed screw, electro-magnetic means for tilting said nut selectively in opposite directions, a shaft having a polished surface and provided with a helical gauge line, gearing connecting the feed screw and shaft, a light source projecting light on said guage line and shaft, a light sensitive cell receiving light reflected from said shaft and having circuit connection with said electro-magnetic means, a perforated diaphragm between the light sensitive cell and shaft, a head stock fixed on said table and including a workpiece driving shaft, gearing connecting the screw and head stock shaft, a tail stock fixed on said table in alinement with the head stock, and a grinding head carried by said bed for supporting a grinding disk in working relation to a workpiece supported by said stock.

9. In a device of the kind described, a bed, a table mounted on said bed for slidable movement longitudinally thereof, a feed screw for driving said table longitudinally, a casing fixed relative to said bed, a nut rotatable in said casing and engaging said feed screw, electro-magnetic means for tilting said nut selectively in opposite directions, a shaft having a polished surface and provided with a helical gauge line, gearing connecting the feed screw and shaft, a light source projecting light on said gauge line and shaft, a light sensitive cell receiving light reflected from said shaft and having circuit connection with said electro-magnetic means, a head stock fixed on said table and including a workpiece driving shaft, gearing connecting the screw and head stock shaft, a tail stock fixed on said table in alinement with the head stock, a grinding head carried by said bed for supporting a grinding disk in working relation to a workpiece supported by said stock, and means to support the grinding head for lateral movement toward and from the axis of the work.

10. In a device of the kind described, a bed, a table mounted on said bed for slidable movement longitudinally thereof, a feed screw for driving said table longitudinally, a casing fixed relative to said bed, a nut rotatable in said casing and engaging said feed screw, electro-magnetic means for tilting said nut selectively in opposite directions, a shaft having a polished surface and provided with a helical gauge line, gearing connecting the feed screw and shaft, a light source projecting light on said gauge line and shaft, a light sensitive cell receiving light reflected from said shaft and having circuit connection with said electro-magnetic means, a perforated diaphragm between the light sensitive cell and shaft, a head stock fixed on said table and including a workpiece driving shaft, gearing connecting the screw and head stock shaft, a tail stock fixed on said table in alinement with the head stock, a grinding head carried by said bed for supporting a grinding disk in working relation to a workpiece supported by said stock, and means to support the grinding head for lateral movement toward and from the axis of the work.

GEORG MÖLLER.